3,010,992
PROCESS FOR PREPARING SERINES

Karl-Hans Brathge, Frankfurt am Main, and Walter Siedel, Bad Soden, Taunus, Germany, assignors, by mesne assignments, to Parke, Davis & Company, Detroit, Mich., a corporation of Michigan
No Drawing. Filed Nov. 22, 1955, Ser. No. 548,537
Claims priority, application Germany Nov. 27, 1954
8 Claims. (Cl. 260—519)

The present invention relates to the preparation of serines of the general formula

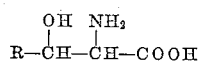

in which R represents a phenyl radical substituted by halogen atoms, alkoxy groups of low molecular weight or nitro groups, or a quinoline radical.

It is known that phenyl serine and homologs of this compound can be obtained by condensation of glycocoll with aromatic aldehydes in alkaline solution. (Liebig's Ann. d. Ch. 284 (1895), pages 36 et seq. and 337 (1904), pages 212 et seq.) From benzaldehyde and glycocoll there is formed, for instance, primarily with separation of water, benzylidene glycocoll which is then reacted with another molecule of benzaldehyde in order to form benzylidene phenyl-serine and, after acidification, to yield phenyl serine. This reaction can generally be extended to aromatic aldehydes, whereby sodium is used as condensing agent (Ber. d. dtsch. Chem. Ges. 52 (1919), pages 1734 et seq.), and, in recent times, preferably serves for preparing phenyl-serine and p-nitrophenyl-serine which, for instance, are used as starting material for the production of chloramphenicol.

Furthermore, it is known to condense p-nitro-benzaldehyde with glycocollic esters by means of metallic sodium in order to obtain p-nitrophenyl serine-esters (J. Chem. Soc. (London), 1949, pages 90 et seq.)

Finally, it is known from German specification 839,500 that non-esterified glycocoll can be condensed with p-nitrobenzaldehyde to p-nitro-phenyl serine by using freshly precipitated calcium hydroxide as a catalyst. Thereby, the threoform of the p-nitrophenyl-serine is obtained while, when starting from glycocoll esters, the erythro form is mainly obtained (cf. C. R. nebd. Séances Acad. Sci. 231, 361 (1950)).

The present invention is based on the discovery that serines can be prepared by reacting glycocoll with benzaldehyde or with aliphatic aldehydes containing 3–4 carbon atoms so as to obtain the corresponding Schiff's bases, condensing the latter in the presence of alkali metal and/or alkaline earth metal hydroxides with benzaldehydes the phenyl nucleus of which is substituted by halogen atoms, alkoxy groups of low molecular weight and/or nitro groups or by condensing them with quinoline aldehydes and decomposing, by means of dilute acid, the substituted Schiff's bases obtained.

When realizing the process according to the invention, the preparation of the serines is effected in two stages, an aldehyde being used for the formation of the Schiff's bases obtained in the first phase of the reaction differing from that used in the subsequent condensation.

As it results from the above mentioned publication in Liebig's Ann. d. Ch. 337 (1904), page 214, the Schiff's base primarily formed during the reaction of glycocoll with aldehydes is partly rearranged by displacement of the double bond, according to the scheme

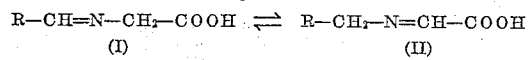

Since the compound II cannot be transformed into serine by additional condensation, the rearrangement entails a reduction of the yield. According to the invention, such aldehydes are used for the first stage, as, in the form of the Schiff's bases formed by means of glycocoll, show an insignificant tendency only for the displacement of the double bond. Thereby, the formation of undesirable by-products in the second stage is diminished.

It has been found that, for instance when preparing p-nitrophenyl-serine according to the process of the invention comprising 2 stages and using benzaldehyde in the first reaction phase, better yields are obtained than those realized with the use of 2 molecules of p-nitrobenzaldehyde and operating in one stage. In the case of difficultly accessible aldehydes the present invention offers the possibility of saving material, if the difficultly accessible material is used in the second stage only.

When heterocyclic aldehydes are used in the second reaction phase, the process of the present invention, in addition, offers the advantage that the basic serines obtained after decomposition of the Schiff's bases by means of acid are present in the form of the corresponding salts which can easily be separated, by shaking out with organic solvents, from non-basic compounds contained in the reaction mixture, i.e. also from aldehyde split off, while the isolation of the serines in the case of using basic aldehydes in the first phase of reaction is connected with difficulties.

For preparing the Schiff's bases in the first reaction phase benzaldehyde and p-toluyl-aldehyde as well as propionic aldehyde and butyric aldehyde can be used.

For the further condensation with the Schiff's base formed in the first stage there enter into consideration organic aldehydes, for instance p-nitrobenzaldehyde, p - chloro - benzaldehyde, o - methoxy - benzaldehyde and quinoline aldehydes, such as quinoline aldehyde-(2).

The preparation of the Schiff's bases obtained in the first stage is suitably carried out in the presence of a solvent and, as such, water or a mixture consisting of water and alcohol, is used. The reaction can be performed in the absence or in the presence of a condensing agent, for instance calcium hydroxide. For the further reaction an isolation of the formed Schiff's bases is not necessary.

The reaction taking place in the second stage is carried out in the presence of alkali metal- and/or alkaline earth metal hydroxides as condensing agents. In the case of carrying out the reaction with p-nitrobenzaldehyde, it is appropriate to use alkaline earth metal hydroxides, preferably freshly precipitated calcium hydroxide. It is of advantage to operate at slightly elevated temperatures. The condensation products are decomposed favourably by means of dilute acids, preferably hydrochloric acid, sulfuric acid or acetic acid. When heterocyclic aldehydes are used, the basic serines obtained after decomposition of the Schiff's bases by means of acids are present in the form of the corresponding salts and can be freed from non-basic compounds, i.e. also from the separated aldehyde, by shaking out with organic solvents, preferably benzene, xylene, or toluene.

The compounds obtained according to the process of the invention are effective pharmaceutics and can be used as intermediate products for preparing valuable medicaments, for instance chloramphenicol.

The following examples serve to illustrate the invention, but they are not intended to limit it thereto.

EXAMPLE 1 p-Nitrophenyl-serine 8 grams of glycocoll are added to a still hot suspension of 3 grams of calcium oxide in 100 cc. of water. After cooling 11 grams of benzaldehyde are added, while vigorously stirring. The separated crystal magma of the Schiff's base is mixed by stirring with 100 cc. of methanol and then diluted with a suspension of 6 grams of calcium oxide in 50 cc. of water. A solution of 15 grams of p-nitrobenzaldehyde in 100 cc. of methanol is then added.

The mixture of substances is allowed to react, while being stirred, for several hours at room temperature of for about 15 minutes in the hot. Subsequently the separated condensation product is filtered with suction, washed with methanol and water and, after drying, introduced into 40 cc. of concentrated hydrochloric acid while being cooled. Thereby the hydrochloride of the p-nitrophenyl-serine crystallizes out which is separated and dissolved in water. After filtration of the solution the p-nitrophenyl-serine is precipitated by addition of sodium acetate. Yield: 12–15 grams (60–70% of the theoretical yield, referred to p-nitrobenzaldehyde).

EXAMPLE 2 p-Nitrophenyl-serine

To a suspension of 3 grams of calcium oxide in 50 cc. of water 8 grams of glycocoll and, after cooling, 7.5 grams of butyric aldehyde are added, while the reaction mixture is vigorously shaken. The formed Schiff's base is diluted with a solution of 15.2 grams of p-nitrobenzaldehyde in 100 cc. of methanol and stirred for one hour at 40° C. After cooling, the condensation product is filtered with suction, washed with methanol, dried and introduced, while being cooled, into concentrated hydrochloric acid. After some time the hydrochloride of the p-nitrophenyl-serine is separated off. According to the direction given in Example 1 it is worked up in order to obtain the free amino acid. Yield: 8–10 grams (40%–50% of the theoretical yield, referred to p-nitrobenzaldehyde).

EXAMPLE 3 p-Nitrophenyl-serine 10 grams of glycocoll are added to 3.7 grams of calcium oxide slaked by 50 cc. of water. After cooling, the reaction mixture is shaken with 9 grams of propionaldehyde, until the latter is consumed, and subsequently the reaction mixture is diluted with 15.2 grams of p-nitrobenzaldehyde in 100 cc. of methanol as well as with a suspension of 7.4 grams of calcium oxide in 100 cc. of water. The reaction mixture is then stirred for 2 hours at 30° C. Upon cooling of the mixture the obtained precipitate is separated and introduced into concentrated hydrochloric acid while being cooled. The hydrochloride of the p-nitrophenyl-serine precipitated thereby is dissolved in 100 cc. of water and transformed into the p-nitrophenyl-serine by means of sodium acetate. Yield: 9 grams.

EXAMPLE 4 p-Nitrophenyl-serine 8 grams of glycocoll are added to a still hot mixture of 7 grams of calcium oxide and 100 cc. of water. After cooling 12 grams of p-toluyl-aldehyde are added while vigorously stirring as well as a certain amount of methanol just sufficient to dissolve the aldehyde. After some minutes the Schiff's base precipitates. Subsequently a suspension consisting of 6 grams of calcium oxide in 50 cc. of water as well as a solution of 15 grams of p-nitrobenzaldehyde in 100 cc. of methanol are added to the mixture. The further treatment in order to obtain p-nitrophenyl-serine is carried out according to the directions given in Example 1.

EXAMPLE 5

Quinolyl-2-serine

The Schiff's base obtained according to the direction given in Example 1 is added to a solution of 16 grams of quinoline-aldehyde-(2) in 100 cc. of methanol. The condensation product precipitated after stirring for several hours at room temperature is filtered with suction, and washed with water and methanol. By means of a short heating with 250 cc. of 2n-hydrochloric acid it is decomposed and freed from non-basic substances by shaking out with benzene. After neutralizing the hydrochloride solution by means of sodium acetate the quinolyl-2-serine is precipitated in crystalline form. Yield: 10–12 grams (50–60% of the theoretical yield, referred to quinoline-aldehyde); melting point: 183° C.

EXAMPLE 6 o-Methoxyphenyl-serine

The Schiff's base obtained according to the directions given in Example 1 is diluted with a solution of 14 grams of o-methoxy-benzaldehyde in 75 cc. of methanol. After a 2–3 hour's stirring at 40° C. the condensation product formed is filtered with suction and washed. It is decomposed by a short heating with excessing dilute acetic acid and the mixture is freed from the precipitated benzaldehyde by shaking it out with benzene. After concentration to a small volume it is diluted with alcohol, the precipitated calcium acetate is separated and ether is then added to the alcoholic solution. Thereby the o-methoxy-phenyl-serine is crystallized out. Yield: 15 grams (70% of the theoretical yield, referred to o-methoxy-benzaldehyde); melting point: 179° C.–180° C.

EXAMPLE 7 p-Chlorophenyl-serine

To a suspension of 4 grams of calcium oxide in 100 cc. of water there are added at first 11 grams of glycocoll and 14 grams of benzaldehyde and then, while vigorously stirring, a solution of 14 grams of p-chloro-benzaldehyde in 50 cc. of methanol. After a 10 minutes' stirring at 50° C. the mixture is allowed to cool and the precipitate formed is filtered with suction. It is dissolved in the hot by means of a mixture consisting of 20 cc. of glacial acetic acid and 50 cc. of water. After shaking out this solution with benzene (in order to eliminate excessive aldehydes) the acetic acid solution is allowed to stand for crystallization. 14 grams of p-chlorophenyl-serine are crystallized out (65% of the theoretical yield, referred to p-chloro-benzaldehyde).

We claim:

1. Process for preparing serines of the formula,

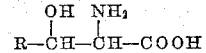

where R is a member of the group consisting of nitrophenyl, halophenyl and lower alkoxy-phenyl which comprises reacting glycocoll with an aldehyde of the group consisting of benzaldehyde, p-toluyl aldehyde, and alkyl aldehydes having 3–4 carbon atoms to form the corresponding Schiff's base having the formula,

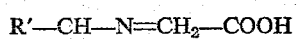

where R' is a member of the group consisting of phenyl, p-toluyl and alkyl having 3–4 carbon atoms, and reacting said Schiff's base with a member of the group consisting of nitrobenzaldehyde, halogen-benzaldehyde, and lower alkoxy benzaldehyde in the presence of a member of the group consisting of alkali metal hydroxides and alkaline earth metal hydroxides as condensing agents, and subjecting the resulting reaction product to hydrolysis.

2. Process according to claim 1 in which a substantially equimolar quantity of aldehyde is reacted with glycocoll and a substantially equimolar quantity of aldehyde is reacted with the intermediate Schiff's base at a temperature up to about 40° C. and the final hydrolysis is carried out with at least one equivalent of acid.

3. Process which comprises reacting glycocoll with benzaldehyde to form a Schiff's base and reacting said Schiff's base with p-nitrobenzaldehyde, thereby forming a substituted Schiff's base and subjecting the resulting reaction product to hydrolysis, thereby obtaining p-nitrophenyl-serine.

4. Process for preparing serines of the formula,

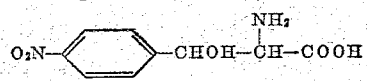

which comprises reacting glycocoll in two successive steps with two different aldehydes followed by hydrolysis, the first step being carried out with an amount of aldehyde R′CHO capable of producing a corresponding Schiff's base of the formula, $$R'-CH=N-CH_2-COOH$$

without formation of any substantial amounts of the isomeric compound where the double bond is displaced and without substantial substitution of the methylene group $CH_2$ of said Schiff's base, the second step being carried out with p-nitrobenzaldehyde and the hydrolysis being carried out with at least one equivalent of acid, where R′ is a member of the group consisting of phenyl, p-toluyl and alkyl having 3–4 carbon atoms.

5. Process according to claim 4 in which the aldehyde R′CHO is benzaldehyde.

6. Process which comprises condensing a Schiff's base of formula $$R'-CH=N-CH_2-COOH$$

where R′ is a member of the group consisting of phenyl, p-toluyl and alkyl having 3–4 carbon atoms, with a member selected from the group consisting of halogen-benzaldehyde, nitrobenzaldehyde, and lower alkoxy-benzaldehyde in the presence of a member selected from the group consisting of alkali metal hydroxides and alkaline earth metal hydroxides as condensing agents and splitting up the substituted Schiff's base thus obtained by means of a dilute acid, thereby obtaining a serine of formula $$\underset{R-CH-CH-COOH}{\overset{OH\ \ NH_2}{|\ \ \ \ \ |}}$$

where R is a member selected from the group consisting of halogen-phenyl, nitrophenyl, and alkoxy-phenyl radicals.

7. Process which comprises condensing a Schiff's base of formula $$R'-CH=N-CH_2-COOH$$

where R′ is a member of the group consisting of phenyl, p-toluyl and alkyl having 3–4 carbon atoms, with nitrobenzaldehyde in the presence of calcium hydroxide, thereby obtaining a substituted Schiff's base.

8. Process which comprises condensing a Schiff's base of formula $$R'-CH=N-CH_2-COOH$$

where R′ is a member of the group consisting of phenyl, p-toluyl and alkyl having 3–4 carbon atoms, with nitrobenzaldehyde in the presence of calcium hydroxide, thereby obtaining a substituted Schiff's base, and splitting the said Schiff's base with a dilute acid thereby obtaining a serine of formula $$O_2N-\!\!\!\left\langle\!\!\!\bigcirc\!\!\!\right\rangle\!\!\!-CHOH-\underset{|}{\overset{NH_2}{C}H}-COOH$$

References Cited in the file of this patent

FOREIGN PATENTS 839,500   Germany _____ May 19, 1952

OTHER REFERENCES

Jour. Chem. Soc. (London), pp. 90–93, 1949.